United States Patent
Saltsman et al.

[11] Patent Number: 5,979,974
[45] Date of Patent: Nov. 9, 1999

[54] FIXED WINDOW SEAL APPARATUS

[75] Inventors: Benjamin J Saltsman, Ferndale; Mark Freeland, Farmington Hills; Michael James Lynch, Livonia; Colin Jeffrey Young, Dearborn, all of Mich.

[73] Assignee: Ford Global Technologies, Inc., Dearborn, Mich.

[21] Appl. No.: 09/221,373

[22] Filed: Dec. 28, 1998

[51] Int. Cl.$^6$ ..................................................... B60J 10/00
[52] U.S. Cl. ........................ 296/201; 296/146.15; 296/93
[58] Field of Search ............................ 296/201, 146.15, 296/93, 96.21, 146.14; 52/717.01, 716.5, 208, 665, 204.59, 204.64; 49/483.1, 489.1

[56] References Cited

U.S. PATENT DOCUMENTS

| | | | |
|---|---|---|---|
| 3,245,182 | 4/1966 | Zierold | 52/208 |
| 3,274,740 | 9/1966 | Hall | 52/208 |
| 3,394,044 | 7/1968 | Bright | 49/440 |
| 3,968,612 | 7/1976 | Endo et al. | 52/208 |
| 4,262,960 | 4/1981 | Fifer . | |
| 4,294,485 | 10/1981 | Engelhard . | |
| 4,332,413 | 6/1982 | Erion . | |
| 4,571,278 | 2/1986 | Kunert | 52/208 X |
| 4,627,655 | 12/1986 | Collins . | |
| 4,843,763 | 7/1989 | Mesnel | 49/440 |
| 4,940,278 | 7/1990 | LePere . | |
| 5,009,462 | 4/1991 | Katcherian | 296/201 |
| 5,112,065 | 5/1992 | Meyer et al. . | |
| 5,261,718 | 11/1993 | Ohlenforst et al. | 296/96.21 |
| 5,396,746 | 3/1995 | Whitmer | 52/208 |
| 5,558,387 | 9/1996 | Sumida et al. | 296/93 |
| 5,586,798 | 12/1996 | Seagusa | 296/146.15 |
| 5,752,351 | 5/1998 | Nozoe | 52/204.591 |
| 5,772,277 | 6/1998 | Fukuda | 296/201 |
| 5,815,997 | 10/1998 | Cornils et al. | 52/208 |

FOREIGN PATENT DOCUMENTS 2132673  11/1983  United Kingdom .

*Primary Examiner*—D. Glenn Dayoan
*Assistant Examiner*—Lori L. Coletta
*Attorney, Agent, or Firm*—Gregory P. Brown

[57] ABSTRACT

A watertight and airtight seal is useful for use between two structures having relative movement therebetween. The seal apparatus includes a first adhesive bead (38) disposed on a first structural member (12) and a second adhesive bead (44) disposed on a second structural member (22). An elastomeric member (30) includes a first flange (34) portion bonded to the first adhesive bead and a second flange portion (36) bonded to the second adhesive bead (44). The elastomeric member also includes a flexible portion disposed between the first and second flange portions, this flexible portion being operative to freely flex during relative motion between the first and second structural members. This flexibility substantially reduces stress otherwise imparted on the first and second adhesive beads during such movements in the absence of the flexible portion, thereby improving the durability of the seal.

14 Claims, 2 Drawing Sheets

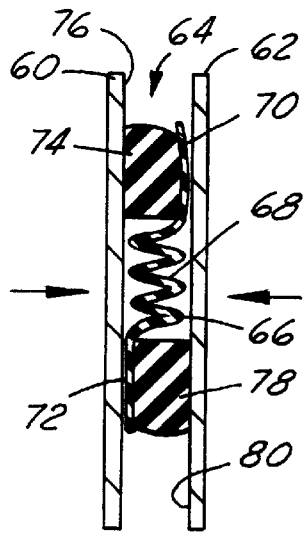 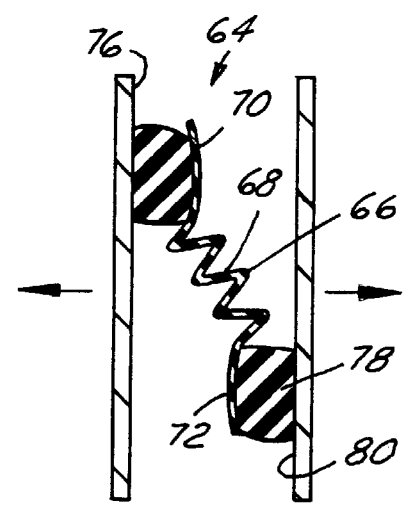 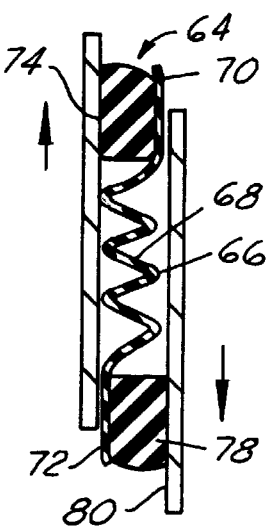
FIG.3A    FIG.3B    FIG.3C
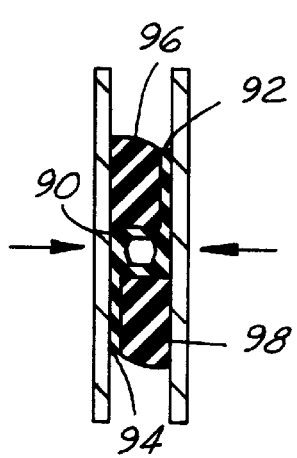 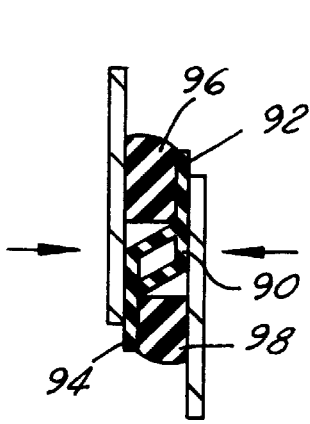 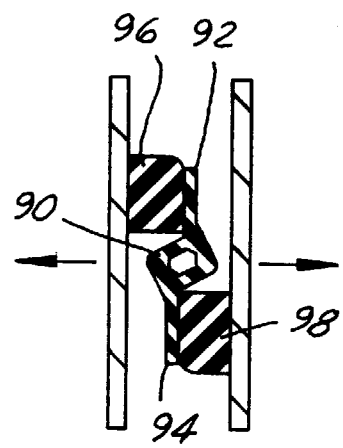
FIG.4A    FIG.4B    FIG.4C

FIXED WINDOW SEAL APPARATUS

BACKGROUND OF THE INVENTION

1. Field of the Invention

The present invention relates generally to seals. More particularly the present invention relates to seals for use on motor vehicle windows.

2. Disclosure Information

Often it is necessary to provide sealing between two components that are assembled together to reduce or completely block transmission of air and liquid. In particular, in motor vehicles having fixed windows, it is desirable to provide such sealing between a window structure and a corresponding body structure to which the window structure is installed. The practice has involved using mechanical fasteners of some form around a periphery of the window structure in combination with a visco-elastic sealer continuously applied as a bead to adjacent members of the structural interface. In many applications, this form of seal is sufficient for the life of the vehicle. However, it has been observed in some severe duty applications, where vehicles are subjected to extremely dusty conditions and driven over very rough terrain, relative motion occurs between the window structure and the body structure at their structural interface. This relative motion, combined with sufficient debris at the seal, over a sufficient cycles may cause the bond of the seal to separate from either the window structure or the body structure.

It would be desirable to overcome the aforenoted difficulties with sealing two structural members, such as a window within a body structure of a motor vehicle by providing a simple, low cost improved seal that prevents the bond of the seal from separating.

SUMMARY OF THE INVENTION

Therefore, the present invention provides an improvement over existing seals by providing a watertight and airtight seal between two structures having relative movement therebetween.

In accordance with the present invention, a seal apparatus includes a first adhesive bead disposed on a first structural member and a second adhesive bead disposed on a second structural member. An elastomeric member includes a first flange portion bonded to the first adhesive bead and a second flange portion bonded to the second adhesive bead. The elastomeric member also includes a flexible portion disposed between the first and second flange portions, this flexible portion being operative to freely flex during relative motion between the first and second structural members. This flexibility substantially reduces stress otherwise imparted on the first and second adhesive beads during such movements in the absence of the flexible portion, improving the durability of the seal.

It is an advantage of the present invention to provide a simple, low cost seal that withstands severe duty without leaking air or water.

BRIEF DESCRIPTION OF THE DRAWINGS

FIGS. 3A–C are cross-sectional views of one embodiment of the present invention showing relative motion between structural members in accordance with the present invention.

FIGS. 4A–C are cross-sectional views of another embodiment of the present invention showing relative motion between structural members in accordance with the present invention.

DETAILED DESCRIPTION OF THE PREFERRED EMBODIMENT

Figure 1:
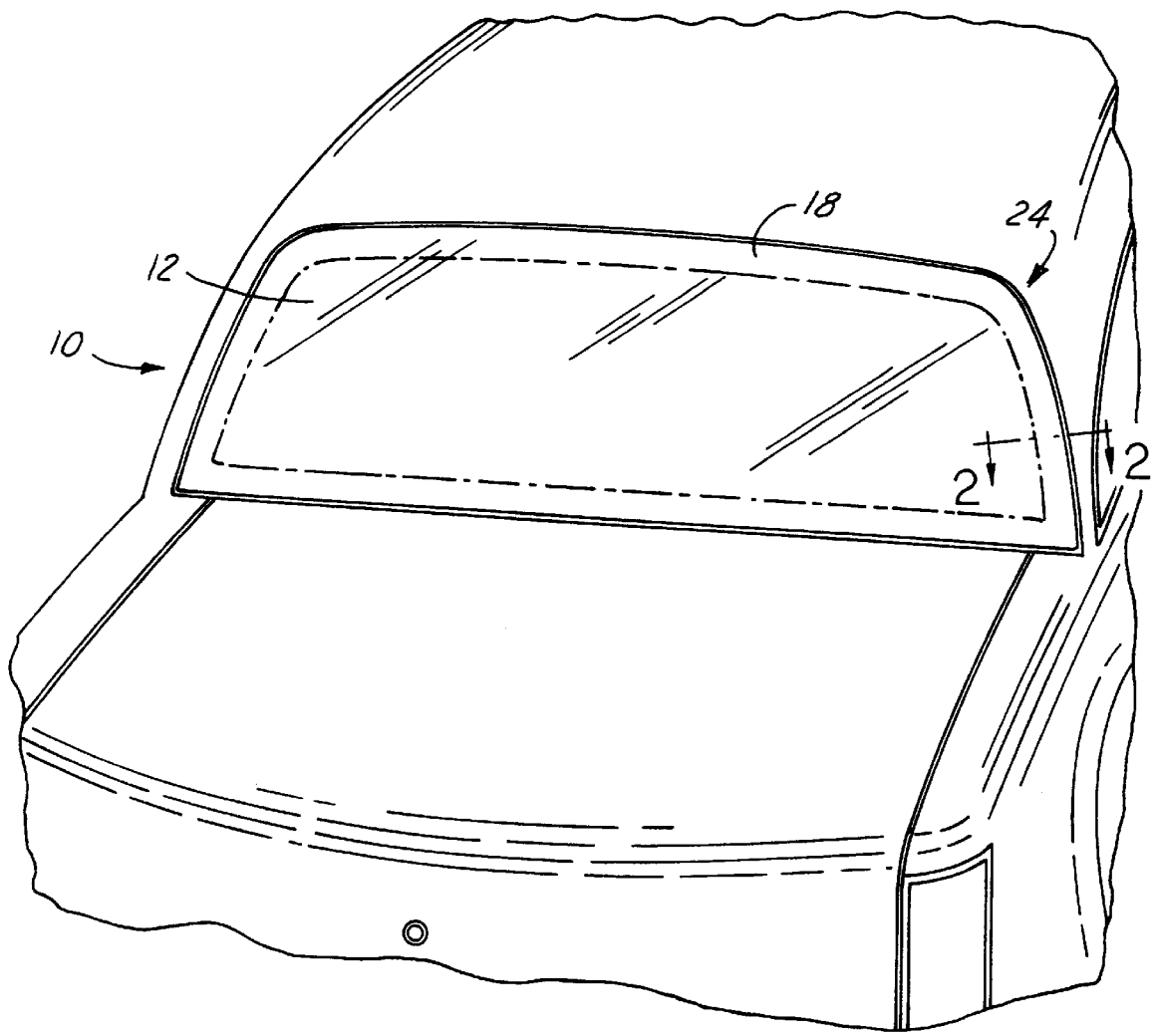
FIG. 1 is a rear perspective view of a motor vehicle and rear window constructed configuration.
Figure 2:
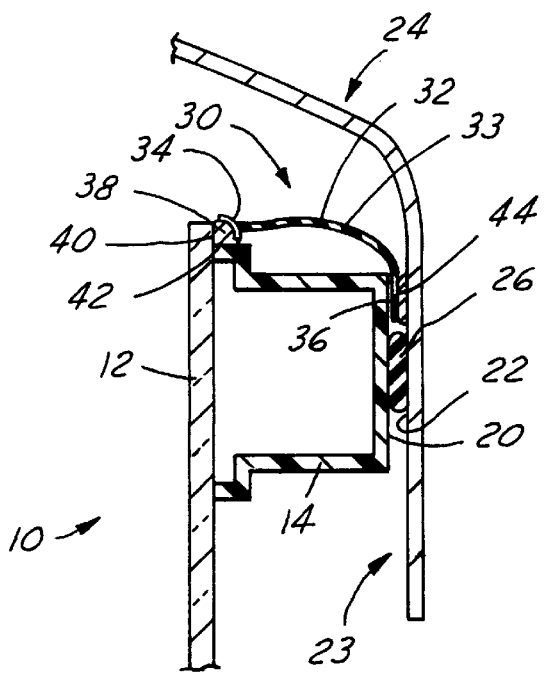
FIG. 2 is a sectional view of taken along line 2—2 from FIG. 1 of a seal for a fixed window installed in a motor vehicle in accordance with the present invention.

Referring now to FIGS. 1 and 2, a window assembly 10 for a motor vehicle is shown. A window 12 is structurally bonded to a window frame 14 in a conventional manner forming a modular window assembly ready for installation in a motor vehicle. The window frame 14 extends continuously around a periphery 18 of the window and includes a mounting surface 20 which is adapted to be attached to a mating mounting surface 22 formed in a recessed window aperture 23 of the vehicle structure 24. Attachment of the window assembly can be accomplished by a combination of an adhesive bead 26, such as a visco-elastic material like butyl rubber and mounting screws or other mechanical fasteners.

The window frame can be formed of any suitably strong and resilient material, including aluminum and plastics, such as polyvinyl chloride, polyurethane and other materials which would be apparent to those skilled in the art in view of the present disclosure.

A seal 30 serves to prevent debris and moisture from contacting the adhesive bead 26. The seal 30 includes an elastomeric member 32 having a central portion 33 positioned between first and second flange portions 34, 36. In the presently preferred embodiment, the flange portions 34, 36 are integrally formed along the peripheral edges of the elastomeric member 32. A first adhesive bead 38 is continuously deposited on an outer edge 40 of the window periphery 18 adjacent to a an outer edge 42 of the window frame 14. The first flange portion 34 is bonded to the window assembly by this first adhesive bead 38. Similarly, a second adhesive bead 44 is continuously deposited on the mounting flange 22 of the window aperture 23 adjacent to an outer edge of the adhesive bead 26. The second flange portion 36 is bonded to the body structure by this second adhesive bead 44.

The central portion 33 of the elastomeric member 32, as installed, includes a sufficient amount of slack to allow a predetermined range of relative movement between the window assembly and the window aperture without becoming taught. Thus, being freely flexible prevents excessive strain from building up in the first and second adhesive beads 38, 44. Without the flexibility, the central portion would become taught, causing the first and second adhesive beads to eventually lose adhesion and allow air and water to pass therethrough.

Referring now to FIGS. 3A–3C and 4A–4C, an alternative embodiment of the present invention is shown. Here the seal is providing a robust seal between first and second structural members 60, 62. The seal 64 includes an elastomeric member 66 having a central portion 68, also positioned between first and second flange portions 70, 72. A first adhesive bead 74 is continuously deposited on an edge 76 of the first structural member. The first flange portion 70 is bonded to the first structural member by this first adhesive bead 74. Similarly, a second adhesive bead 78 is continuously deposited on an edge 80 of the second structural member 62.

FIGS. 3A–3C individually illustrate operation of the present invention where a central portion 68 is made in the form of an accordion, having a series of angular hinges having acute angles formed therebetween. FIG. 3A shows the two structural members in a compressively loaded condition, FIG. 3B shows extension of the two structural members and FIG. 3C shows shearing of the two structural members.

FIGS. 4A–4C individually illustrate operation of yet another embodiment of the present invention where a central portion 90 has square tubular cross-section and diametrically opposed first and second flanges 92, 94 bonded to first and second adhesive beads 96, 98. Unlike the previously illustrated embodiments, the square tubular cross section enables the seal to sustain a compressive loading condition in addition to the tensile loading condition.

In each of the embodiments illustrated in FIGS. 3A–3C and 4A–4C, central portion of the elastomeric member, as installed, includes a sufficient amount of free travel or slack to allow a predetermined range of relative movement between the first and second structural members without inducing strain and stress into the first and second adhesive beads. Thus, being freely flexible prevents excessive strain from building up in the first and second adhesive beads. Without the flexibility, the central portion would become taught, causing the first and second adhesive beads to eventually lose adhesion and allow air and water to pass therethrough.

Various modifications and variations will no doubt occur to those skilled in the art to which this invention pertains. Those and all other variations which basically rely on the teachings by which this disclosure has advanced the art are properly considered within the scope of this invention as defined by the appended claims.

We claim:

1. A seal apparatus for creating a watertight and airtight seal between two structural members subject to relative movement therebetween, said seal apparatus comprising:

a first adhesive bead disposed on a first structural member;

a second adhesive bead disposed on a second structural member; and an elastomeric member having a first flange portion bonded to said first adhesive bead and a second flange portion bonded to said second adhesive bead;

said elastomeric member also including a flex means disposed between said first and second flange portions, said flex means being operative to freely flex during relative motion between said first and second structural members thereby substantially reducing stress otherwise imparted on said first and second adhesive beads during such movements in the absence of said flex means.

2. The seal apparatus according to claim 1, wherein said flex means comprises a flexible portion disposed between said first and second flange portions and having sufficient slack therebetween so as to allow a predetermined range of relative motion between said first and second structural members with a minimal increase in tension loading in said elastomeric member.

3. The seal apparatus according to claim 1, wherein said flex means comprises a plurality of angular hinges disposed between said first and second flange portions, said hinges being operative to open, thereby lengthening said elastomeric member so as to allow a predetermined range of relative motion between said first and second structural members with a minimal increase in tension loading.

4. The seal apparatus according to claim 3, wherein said plurality of angular hinges include a series of acute angles forming a flexible bellows.

5. The seal apparatus according to claim 3, wherein said plurality of angular hinges include a square tubular portion having said first and second flange portions disposed at diametrically opposed corners of said tubular portion.

6. A seal apparatus for creating a watertight and airtight seal between two structural members subject to relative movement therebetween, said seal apparatus comprising:

a first adhesive bead disposed on a first structural member;

a second adhesive bead disposed on a second structural member; and an elastomeric member having a first flange portion bonded to said first adhesive bead and a second flange portion bonded to said second adhesive bead, said elastomeric member also including a flexible central portion characterized in that the flexible central portion allows a predetermined range of flexible motion between said first and second structural members with substantially no increase in tension loading in said elastomeric member.

7. The seal apparatus according to claim 6, wherein said flexible central portion further comprises a plurality of angular hinges disposed between said first and second flange portions, said hinges being operative to open, thereby lengthening said elastomeric member so as to allow said predetermined range of relative motion between said first and second structural members with substantially no increase in tension loading.

8. The seal apparatus according to claim 7, wherein said plurality of angular hinges include a series of acute angles forming a flexible bellows.

9. The seal apparatus according to claim 7, wherein said plurality of angular hinges include a square tubular portion having said first and second flange portions disposed at diametrically opposed corners of said tubular portion.

10. A seal apparatus for creating a watertight and airtight seal between a window frame and a vehicle structure for a motor vehicle, said seal apparatus comprising;

a window frame having a continuous periphery and a window attached thereto;

a vehicle structure having a window aperture and mounting flange having a continuous periphery;

a visco-elastic bead bonding said window frame to said mounting flange of said recessed window aperture;

a first adhesive bead continuously disposed on said periphery of said window frame;

a second adhesive bead continuously disposed on a periphery of said mounting flange of said window aperture; and an elastomeric member having a first flange portion bonded to said first adhesive bead and a second flange portion bonded to said second adhesive bead;

said elastomeric member also including a flex means disposed between said first and second flange portions, said flex means being operative to freely flex during relative motion between said window frame and said vehicle structure thereby substantially reducing stress otherwise imparted on said first and second adhesive beads during such movements in the absence of said flex means.

11. The seal apparatus according to claim 10, wherein said flex means comprises a flexible portion disposed between said first and second flange portions and having sufficient slack therebetween so as to allow a predetermined range of relative motion between said window frame and said vehicle structure with a minimal increase in tension loading in said elastomeric member.

12. The seal apparatus according to claim 10, wherein said flex means comprises a plurality of angular hinges disposed between said first and second flange portions, said hinges being operative to open, thereby lengthening said elastomeric member so as to allow a predetermined range of relative motion between said window frame and said vehicle structure with a minimal increase in tension loading.

13. The seal apparatus according to claim 12, wherein said plurality of angular hinges include a series of acute angles forming a flexible bellows.

14. The seal apparatus according to claim 12, wherein said plurality of angular hinges include a square tubular portion having said first and second flange portions disposed at diametrically opposed corners of said tubular portion.

* * * * *